United States Patent
Adomeit et al.

[11] Patent Number: 6,015,071
[45] Date of Patent: Jan. 18, 2000

[54] VEHICLE STORAGE DIVIDER

[75] Inventors: Mark E. Adomeit; Kevin J. Fellows, both of Holland; Philip P. Cannon, Norton Shores; David J. Spykerman, Zeeland; Rollin E. Nothwehr, Holland, all of Mich.

[73] Assignee: Prince Corporation, Holland, Mich.

[21] Appl. No.: 08/814,653

[22] Filed: Mar. 11, 1997

[51] Int. Cl.[7] ............................................. B60R 7/02
[52] U.S. Cl. .................... 224/42.34; 224/925; 220/9.2; 220/6; 220/7
[58] Field of Search ............................ 224/925, 42.34, 224/42.33; 220/9.2, 9.3, 6, 7, 531, 666

[56] References Cited

U.S. PATENT DOCUMENTS

| | | |
|---|---|---|
| 110,991 | 1/1871 | Miller . |
| 728,749 | 5/1903 | McCord . |
| 810,574 | 1/1906 | Sewell . |
| 846,788 | 3/1907 | Friedheim . |
| 1,157,045 | 10/1915 | Risher . |
| 1,202,253 | 10/1916 | Vitt . |
| 1,470,898 | 10/1923 | Webb . |
| 1,484,789 | 2/1924 | Lackey . |
| 1,905,890 | 4/1933 | Blakely . |
| 2,049,620 | 8/1936 | Reed et al. . |
| 2,175,949 | 10/1939 | Allen . |
| 2,256,928 | 9/1941 | Slack et al. . |
| 2,784,027 | 3/1957 | Temp . |
| 2,867,471 | 1/1959 | Coon, Jr. . |
| 2,898,146 | 8/1959 | Yudenfreund . |
| 3,132,781 | 5/1964 | Poczatek . |
| 3,319,684 | 5/1967 | Calhoun . |
| 3,376,994 | 4/1968 | Flinn, Jr. ................................. 220/6 |
| 3,544,021 | 12/1970 | Wilson et al. . |
| 3,557,855 | 1/1971 | Weingarten ............................. 220/6 |
| 3,987,945 | 10/1976 | McDowell .............................. 220/7 |
| 4,014,292 | 3/1977 | Coughlin et al. . |
| 4,029,244 | 6/1977 | Roberts . |
| 4,170,313 | 10/1979 | Caves et al. . |
| 4,181,236 | 1/1980 | Prodel . |

(List continued on next page.)

FOREIGN PATENT DOCUMENTS

| | | |
|---|---|---|
| 4015556 | 11/1990 | Germany . |
| 2274832 | 8/1994 | United Kingdom . |

*Primary Examiner*—Linda J. Sholl
*Attorney, Agent, or Firm*—Price, Heneveld, Cooper, DeWitt & Litton

[57] ABSTRACT

A storage system in which a base is preferably blow-molded of a lightweight polymeric material and includes a peripheral raised edge including integral sockets for receiving pivoted front and rear walls, as well as end walls and dividers. The end walls of the preferred embodiment are made of a foldable material, such that they collapse integrally with the front and rear walls, while the dividers snap-fit into the base and interlock with the front and rear walls for use. Each of the front, rear and end walls, as well as the dividers, can be folded flat for compact storage of the divider unit.

10 Claims, 4 Drawing Sheets

U.S. PATENT DOCUMENTS

| | | |
|---|---|---|
| 4,189,056 | 2/1980 | Majewski . |
| 4,226,348 | 10/1980 | Dotter et al. . |
| 4,300,695 | 11/1981 | Hsu . |
| 4,305,519 | 12/1981 | Gerich . |
| 4,351,555 | 9/1982 | Hashimoto . |
| 4,358,035 | 11/1982 | Heidecker . |
| 4,540,213 | 9/1985 | Herlitz et al. . |
| 4,576,329 | 3/1986 | Wright et al. . |
| 4,693,386 | 9/1987 | Hughes et al. . |
| 4,718,584 | 1/1988 | Schoeny . |
| 4,960,223 | 10/1990 | Chiang et al. . |
| 4,964,528 | 10/1990 | Wagoner . |
| 5,025,964 | 6/1991 | Phirippidis . |
| 5,054,668 | 10/1991 | Ricchiuti . |
| 5,094,375 | 3/1992 | Wright . |
| 5,129,612 | 7/1992 | Beaupre . |
| 5,161,700 | 11/1992 | Stannis et al. . |
| 5,161,709 | 11/1992 | Oestreich, Jr. . |
| 5,167,433 | 12/1992 | Ryan . |
| 5,193,706 | 3/1993 | Hanna et al. . |
| 5,289,941 | 3/1994 | Blankenburg et al. . |
| 5,347,746 | 9/1994 | Letson . |
| 5,381,940 | 1/1995 | Wright . |
| 5,398,834 | 3/1995 | Umiker . |
| 5,419,602 | 5/1995 | VanHoose . |
| 5,484,091 | 1/1996 | Malinowski et al. . |
| 5,501,384 | 3/1996 | Wisniewski . |
| 5,515,987 | 5/1996 | Jacques et al. . |
| 5,535,931 | 7/1996 | Barlow et al. . |
| 5,538,148 | 7/1996 | Indyk . |
| 5,622,276 | 4/1997 | Simmons ................... 220/6 |
| 5,788,103 | 8/1998 | Wagner et al. ............. 220/6 |

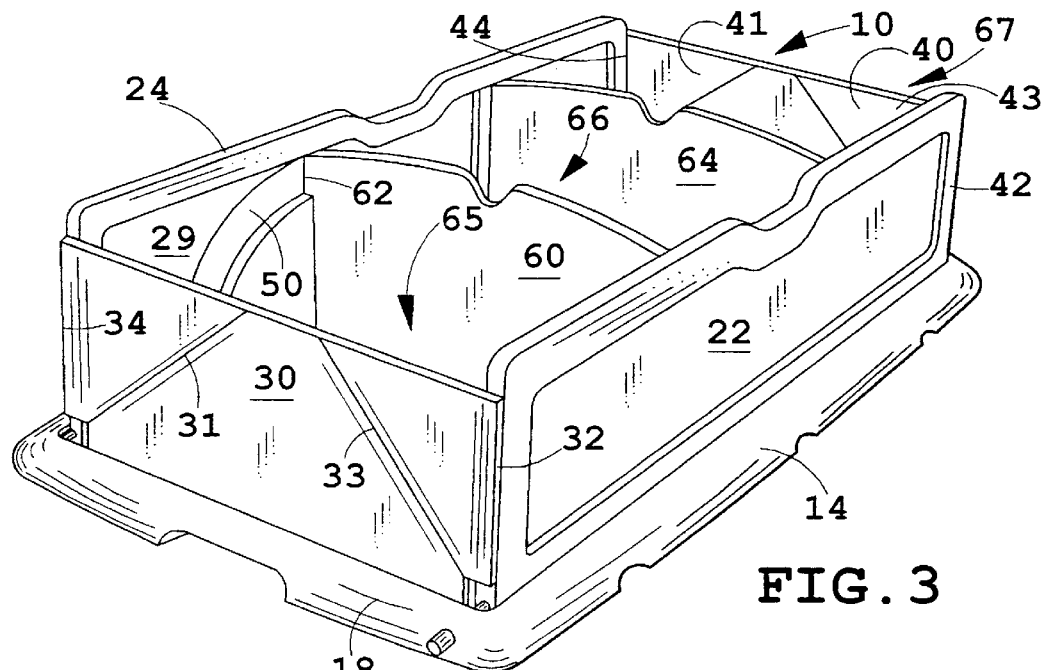
FIG. 3
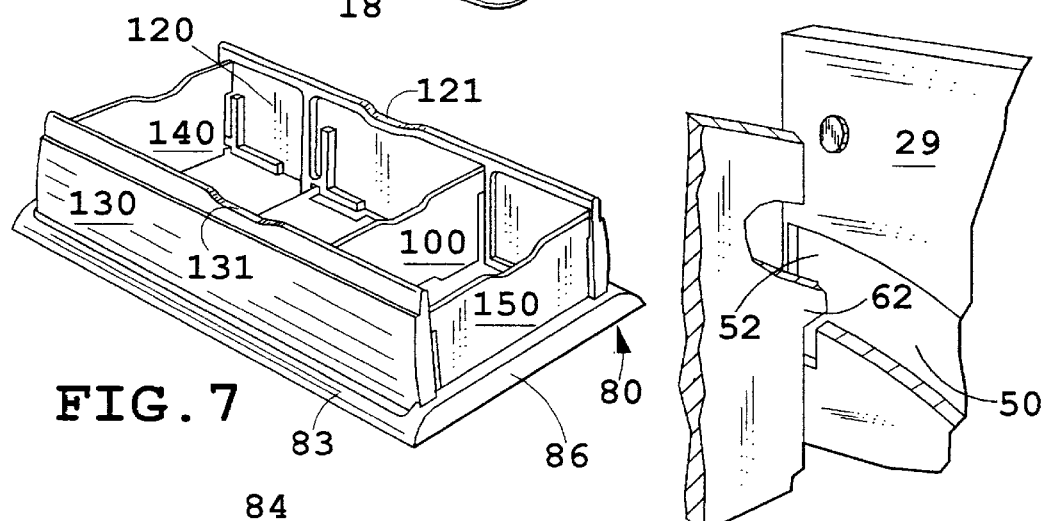
FIG. 7
FIG. 4
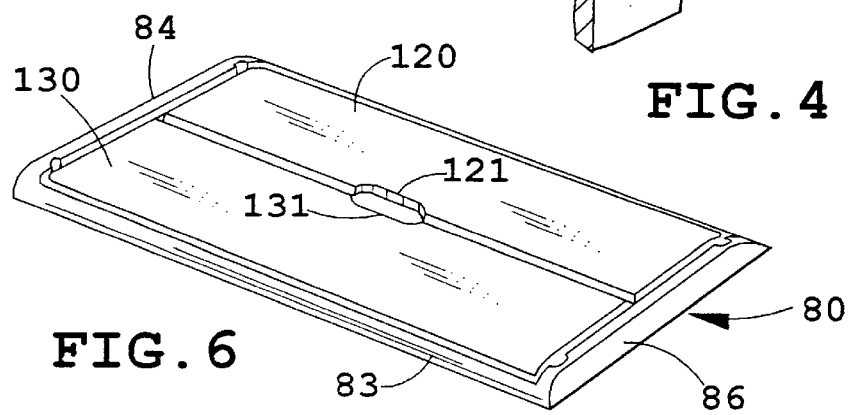
FIG. 6

VEHICLE STORAGE DIVIDER

BACKGROUND OF THE INVENTION

The present invention relates to a collapsible trunk storage system by which the trunk or rear area of a vehicle can be conveniently divided into separate storage areas.

With the recent popularity of mini vans, vans, hatchbacks and other vehicles which have a relatively flat trunk area with little confinement of packages placed therein, there exists a need for a system by which, when needed, provides individual storage areas for segregating and supporting items such as grocery bags and the like and yet, when not needed, can be folded flat, occupying little space, so that the storage device need not be removed from the vehicle. Several relatively complicated, interlocking storage devices have been proposed including those of U.S. Pat. Nos. 4,226,348; 4,718,584; 5,025,964; 5,161,700; and 5,535,931. Although these storage devices serve to provide segregation and support for individual items, they tend to be somewhat complicated, expensive and are not easily converted between stored and use positions. Thus, there exists a need for an inexpensive, durable, easy-to-use and compact storage system for dividing the rear storage area of vehicles for the convenience of the user as well as facilitating the support, of items during transit.

SUMMARY OF THE PRESENT INVENTION

The system of the present invention provides such a storage system in which a base, preferably blow-molded of a lightweight polymeric material, is defined by support platforms surrounded by a peripheral raised edge including integral sockets for receiving pivoted front and rear walls, as well as end walls and intermediate partitions. The end walls of one embodiment are made of a foldable material, such that they collapse for storage. The partitions pivotally snap-fit into the base and interlock with the front and rear walls for use. Each of the front, rear and end walls, as well as the partitions, are folded flat for compact storage of the divider unit, These and other features, objects and advantages of the present invention will become apparent upon reading the following description thereof together with reference to the accompanying drawings.

BRIEF DESCRIPTION OF THE DRAWINGS

FIG. 3 is a perspective view of the structure shown in FIGS. 1 and 2, shown in an open or use position with partitions extended for dividing the storage area into three separate areas;

FIG. 4 is an enlarged perspective view of one of the arcuate tracks and locking slots for the partitions of the structure shown in FIGS. 1–3;

FIG. 6 is a perspective view of the structure shown in FIG. 5 in its assembled and stored position;

FIG. 7 is a perspective view of the structure shown in FIGS. 5 and 6, shown in its open, use position;

DETAILED DESCRIPTION OF THE PREFERRED EMBODIMENT

Figure 1:
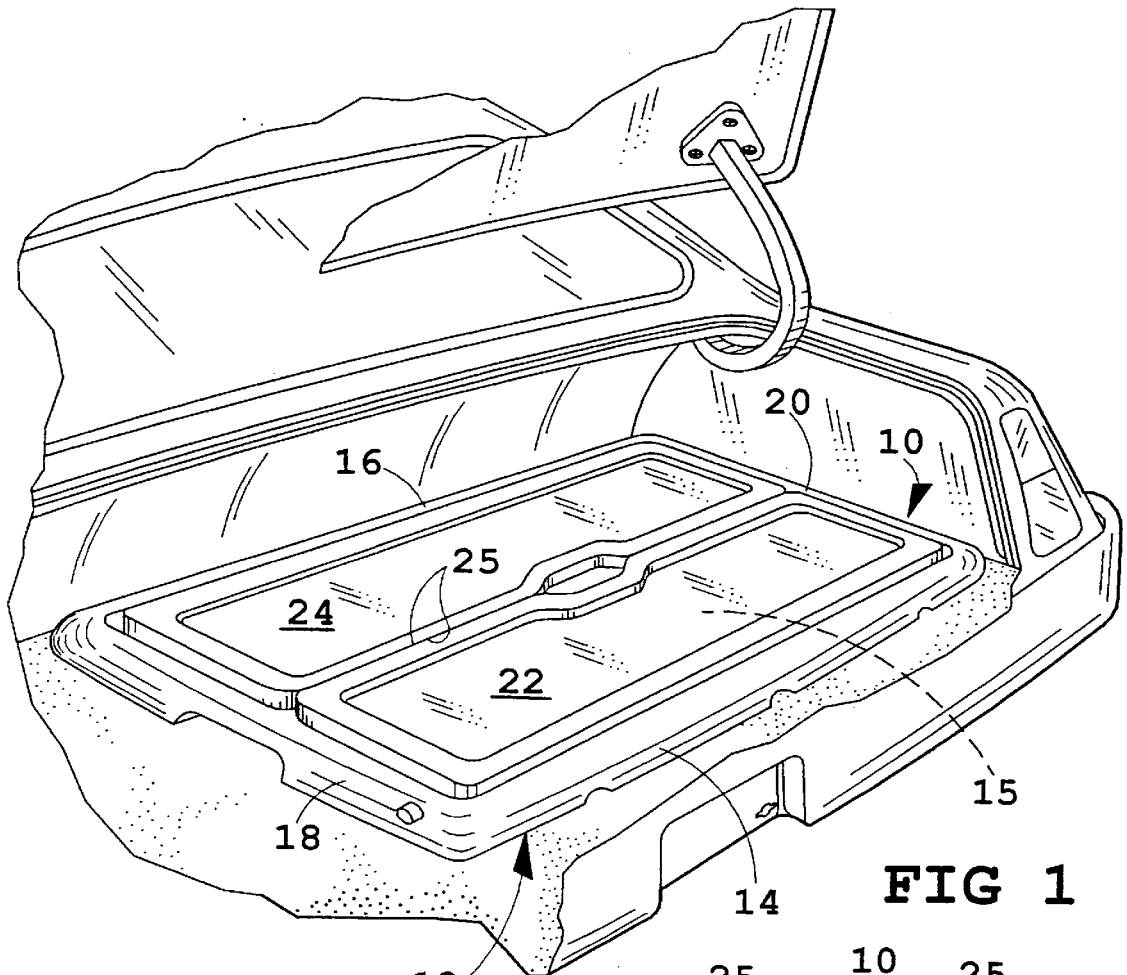
FIG. 1 is a perspective view of the first embodiment of the present invention shown in a collapsed, stored position.
Figure 2:
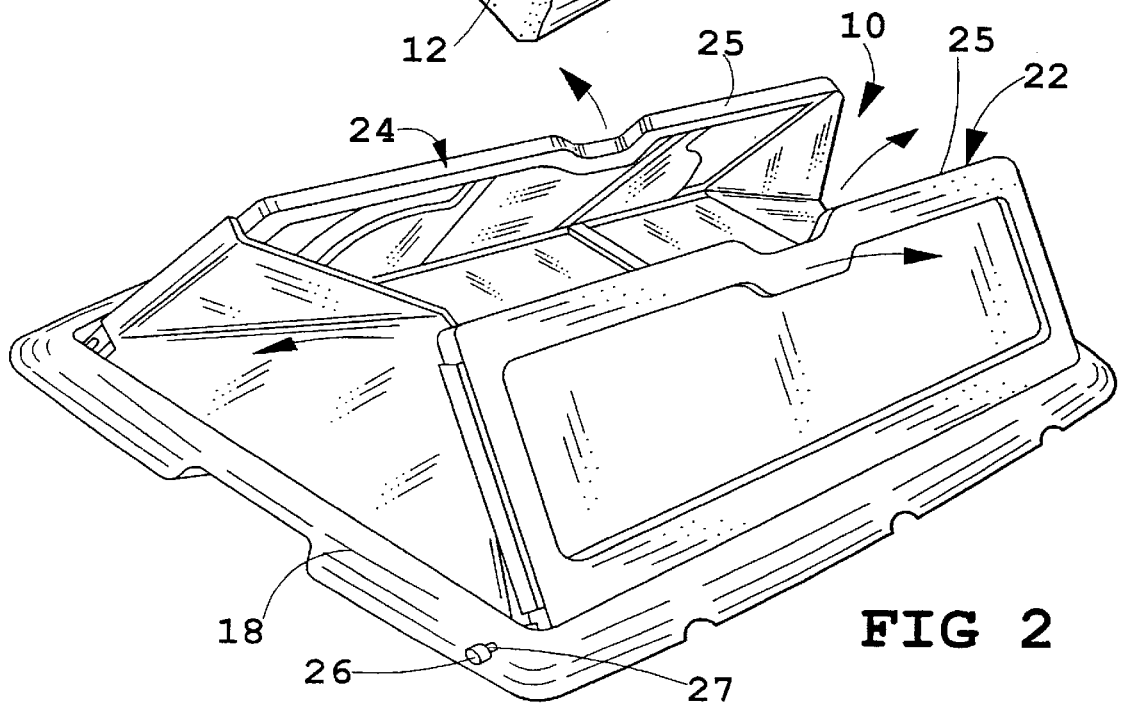
FIG. 2 is a perspective view of the structure shown in FIG. 1, shown in a partially open position.

Referring initially to FIGS. 1–3, there is shown a collapsible storage unit 10 of the present invention, which is adapted for use in a flat storage area of a vehicle 11, such as the rear storage area of a van, hatchback or in the trunk of a more conventional automobile. The collapsible storage system 10 comprises a generally rectangular base 12 defined by a rectangular peripheral raised lip defined by a rear (relative to the vehicle) edge 14, a front edge 16 and sides 18, 20, integrally formed with a floor 15 extending between the raised edges. Base 12 can be integrally blow-molded of a suitable polymeric material, such as polyvinyl chloride or the like, with the raised edges being hollow. Pivotally mounted to the edges are molded polymeric front and rear walls 24 and 22 having a width slightly less than that of the base so that they collapse within the raised edges of the base to a relatively flat position adjacent the floor of the base when collapsed, as seen in FIG. 1. The height of walls 22 and 24 are substantially equal to half the depth of the base so that the top edges 25 lay adjacent one another when collapsed, as seen in FIG. 1. The lower edges of each of the front and rear walls are pivotally mounted through the edges 18 and 20, respectively, of base 12 by means of pivot pins 26 at each of the corners of the base. Pivot pin 26 on one end can be integral with the reinforced lower edge of each of the walls 22 and 24 and inserted through an aperture in edges 18 or 20. The remaining corners of walls 22 and 24 include an aperture for receiving pin 26 (FIG. 2), which extends into an aperture 27 in edge 18 of base 12, for pivotally holding the walls in position. Coupled to the outer vertically extending edges of the front and rear walls 24 and 22, respectively, are collapsible end walls 30 and 40, which in the preferred embodiment comprise fabric which is coupled by suitable bonding adhesives along their edges 32, 34 and 42, 44, respectively, to the ends of front and rear walls 24 and 22. The fabric can be relatively heavy weight and include diagonal fold lines 31 and 33 in wall 30 and similar fold lines 41 and 43 in end wall 40 such that when partially collapsed, as shown in FIG. 2, the end walls fold flat under the front and rear walls 24 and 22.

The inner surfaces 29 and 28 of the front and rear walls 24 and 22, respectively, include arcuate slots 50 which extend from near the floor of base 12 in an arc of approximately 90° and terminate in a notch 52 (FIG. 4) for lockably receiving a tab 62 extending from near the top of each of the partition walls 60 or 64 pivotally mounted to the floor utilizing pivot pins extending through the front and rear edges 16 and 14, respectively. Thus, the partition walls 60 and 64 are guidably held between walls 22 and 24 by tabs 62 which ride within arcuate slots 50 and snap-lock into a raised vertical position, as seen in FIG. 3, with tabs 62 engaging notches 52. Walls 22 and 24 can also be blow-molded such that they have an outer surface and an inner surface in which the arcuate recesses 50 are formed.

The entire assembly of the FIGS. 1–4 embodiment can be extremely lightweight and is moved from a closed position, shown in FIG. 1, by opening the front and rear walls, as illustrated in FIG. 2, to a fully open position, as shown in FIG. 3, which automatically expands end walls 30 and 40. Next, the partitions 60 and 64 are extended with their tabs 62 riding through the arcuate guide slots 50 until the partitions snap-lock, thus holding the flexible sidewalls 30 and 40 in a taught, vertically extending position and dividing the collapsible storage system into three separate storage bins 65, 66 and 67. The storage system shown in FIGS. 1–4 is dimensioned such that each of the storage bins can hold up to three standard paper grocery bags in front to back relationship, although as can be appreciated, the dimensions can be varied as desired for carrying a greater or lesser number of items. Preferably, the base 12 is selected, as are the walls, for a given vehicle model such that the storage space in the rear of the vehicle is fully utilized. Partitions 60 and 64 are rigid and made of a polymeric material, such as ABS, and are shaped to add stiffness and rigidity to the divider unit when opened to its use position, as shown in FIG. 3.

Figure 5:
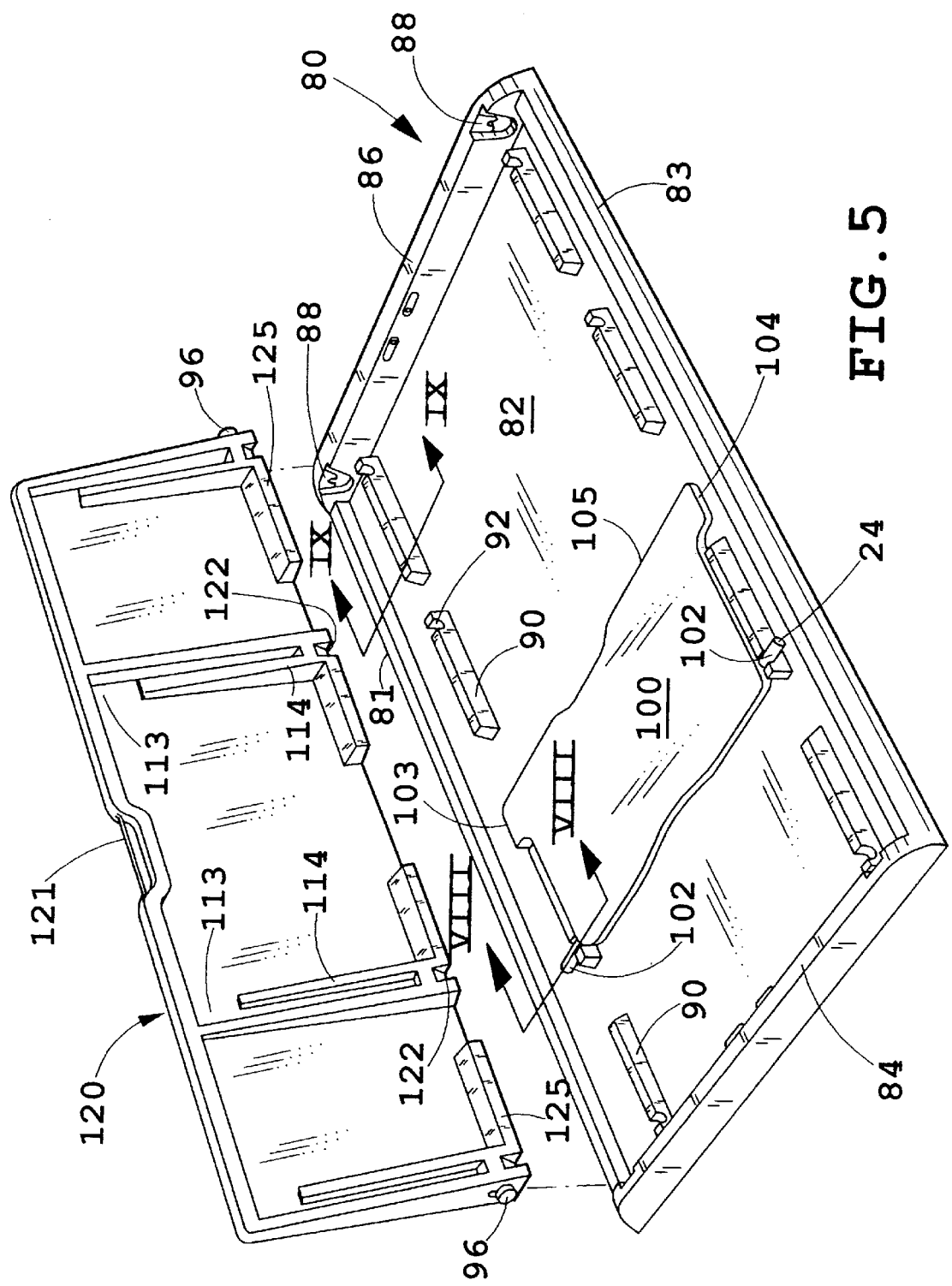
FIG. 5 is a fragmentary perspective partially exploded view of an alternative embodiment of the present invention.

In the embodiment shown in FIGS. 5–9, a somewhat similar structure is disclosed in which a blow-molded base 80 is provided and includes a raised peripheral border defining edges for the floor 82. The edges include a front edge 81, a rear edge 83 and sides 84 and 86. Extending upwardly at spaced locations inwardly from front and rear edges 81 and 83 are mounting bosses 90, each of which are integrally molded with the base 80 and each of which include a socket 92 for pivotally receiving snap-in axles 102 of divider panels 100. The mounting bosses 90 are aligned in pairs adjacent but spaced from the front and rear edges 81 and 83 of the base for snap-receiving divider panels 100. Divider panels 100 include a pair of stub axles 102 which extend within snap-in sockets 92 and pivotally mount the dividers to the base 80. The dividers 100 are somewhat T-shaped with upper flanges 103, 104 along the top edges 105 thereof for nesting between mounting bosses 90, as illustrated in FIG. 5, and for engaging slots 113 in the front pivoted wall 120 and a similar slot formed in the Tear wall 130 (FIG. 6). Each of the panels 130 and 120 forming the front and rear walls of the storage container, as seen in FIG. 7, include recessed areas 131, 121 defining a handle for easily raising the front and rear walls for movement of the storage container from its flat stored position, shown in FIG. 6, to the raised use position, shown in FIG. 7.

Figure 8:
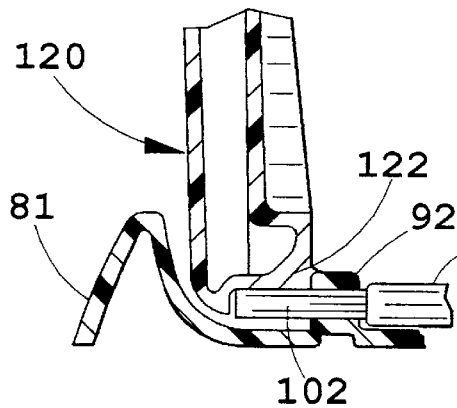
FIG. 8 is an enlarged fragmentary cross-sectional view of the interconnection of one of the walls and the dividers taken along section line VIII—VIII of FIG. 5 when the structure is assembled.
Figure 9:
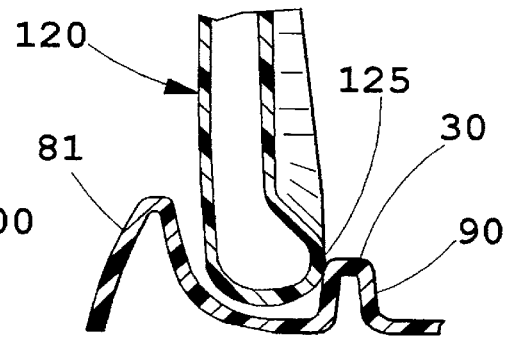
FIG. 9 is an enlarged fragmentary perspective view of the interface between the cover and base taken along section lines IX—IX of FIG. 1 when the structure is assembled.

The inside comers of sides 84 and 86 of base 80 include sockets 88 at each of the four corners of the base for snap-receiving a stub pivot axle 96 at the opposite corners of each of the front and rear walls 120, 130. The bottom edge of the front and rear panels 120, 130, respectively, include slots 122 which extend over the axles 102 of each of the dividers 100 for locking the dividers in place, as best seen in FIG. 8, when the front and rear walls are snap-locked to the base 80. This retains the dividers 100 in position while allowing them to pivot between the stored flat position, as seen in FIG. 5, to a raised divided position, as seen in FIG. 7. The panels 140, 150 are of the same construction as divider 100, shown in FIG. 5, and are mounted at opposite ends of the base 80 to define end walls for the structure when raised to their storage position, as seen in FIG. 7. As best seen in FIGS. 5, 8 and 9, the front and rear panels 120, 130 are hollow blow-molded members which provide lightweight, low cost construction and yet provide structural rigidity to the unit. The ribs 114 (FIG. 5) provide strength as well as interlocking with the dividers 100 to provide a stable, collapsible storage platform for use in holding packages in the rear storage area of a vehicle. Each of the front and rear walls 120 and 130, respectively, include, in spaced relationship along their lower edges aligned with each of the mounting bosses 90, outwardly projecting lands 125, which, as seen in FIG. 9, engage the outer surface of the mounting bosses 90 to align the front and rear walls 120 and 130 in a generally vertically extending position. Thus, the lands 125 and mounting bosses 90 serve as interlocking stops for holding the front and rear walls 120 and 130, respectively, in a generally vertically extending orientation. In this position, the flanges 103 and 104 of each of the dividers 100 snugly snap-lock within the recesses 113 formed in the reinforcing ribs 114 of the front and rear walls. The unique snap-together, interlocking relationship of the base 80, front and rear walls 120 and 130, respectively, and dividers 100 provide an easily used system which is readily assembled and easily used.

Figure 10:
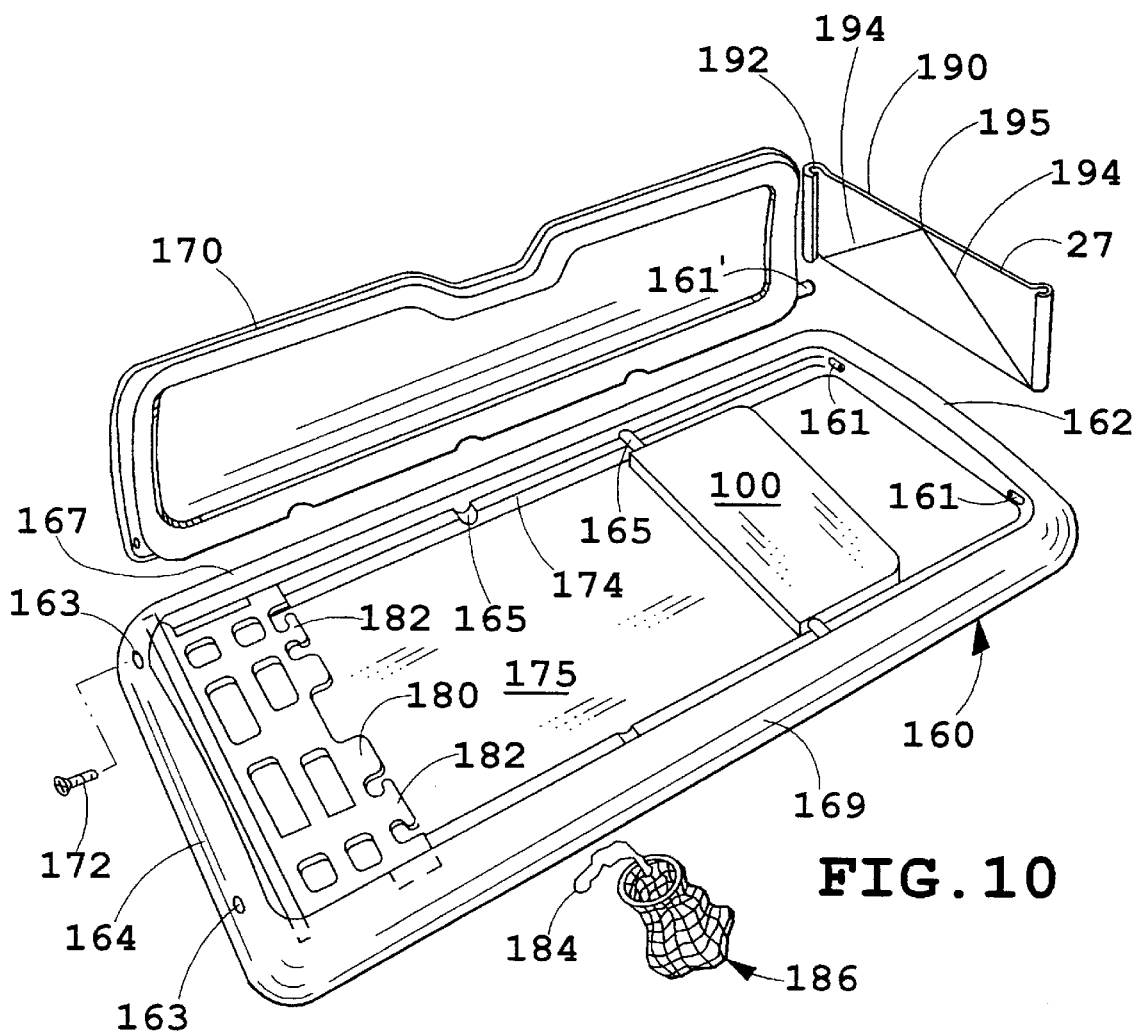
FIG. 10 is a fragmentary perspective view of yet another embodiment of the present invention, showing alternate end walls and the mounting of the front wall to the base.

FIG. 10 shows yet an alternative embodiment of the structure shown in the previous figures in which a polymeric blow-molded base 160 is provided with a peripheral lip defining front, rear and integral side edges. Front and rear folding walls 170 (only the front panel shown) are pivotally mounted to the base by means of an aperture 161 at opposite corners of the right edge 162 of base 160 which receives a stub axle 161 and by bolts 172, which extend through apertures 163 in edge 164 of base 160, to pivotally mount the front and rear walls 170 to the base for collapsible storage. The front and rear lips 167, 169 formed on the base 160 include slots 165 for receiving the pivot axles of snap-in dividers 100, of the same construction as dividers 100 shown in the embodiment of FIGS. 5–9, with rails 174 in which the sockets 165 are formed inset slightly from the peripheral edge of the base 160. End walls 180, 190 are likewise pivotally mounted in opposed sockets 165. The end walls may be made of a rigid polymeric material having a plurality of apertures, such as the left end wall 180, to which posts 182 may extend along the top edge thereof for receiving the drawstring 184 of a mesh bag 186 for additional storage of small items when the end wall is raised and interlocked with the front and rear walls in the same manner as disclosed in FIGS. 5–9. The end wall may also take the form of a material as illustrated by the right end wall 190 made of a fabric which can be vertically pivotally mounted to the edges of front and rear walls 170 by a pivot pin 192 and allowed to collapse by folding as the front and rear walls are moved to a closed position. For such purpose and to assist in rigidifying the fabric end wall, a pair of rigid polymeric struts 194 extending from the corners to a central apex 195 may be employed and are flexibly attached to the fabric end wall 190 to allow the fabric to fold flat in the same manner as the end wall embodiment shown in FIGS. 1–4. As in the previous embodiments, the floor 175 of base 160 is slightly recessed and protects the floor of the vehicle in the event of spillage of small amounts of liquid, which will be contained within the tray defined by the peripheral lip of the molded base.

It will become apparent to those skilled in the art that various modifications to the preferred embodiments of the invention as described herein can be made without departing from the spirit or scope of the invention as defined by the appended claims.

The embodiments of the invention in which an exclusive property or privilege is claimed are defined as follows:

1. A collapsible storage divider for a vehicle comprising:
  a molded polymeric base having a raised lip extending around the outer periphery thereof;
  front and rear walls pivotally mounted to said base within opposite edges of said peripheral lip, wherein said front and rear walls include inside-facing surfaces, each having a tab receiving slot;
  end walls mounted to edges of said front and rear walls for collapsing flat as said front and rear walls are folded toward one another to a flat position within said peripheral lip of said base such that said storage member is substantially flat when folded to a stored position; and a partition wall for holding said divider in an open position with said front and rear walls and sidewalls in a generally vertically raised position for use, said partition wall pivotally mounted to said base between said front and rear walls and having locking tabs engaging said tab-receiving slots of said front and rear walls for guiding and holding said front and rear walls as said partition is raised from a flat stored position to a substantially vertical position.

2. The storage divider as defined in claim 1 wherein said base is blow-molded of a polymeric material.

3. The storage divider as defined in claim 1 wherein said end walls are made of fabric.

4. The storage divider as defined in claim 1 wherein the length of said front and rear walls is less than one half the depth of said base such that said front and rear walls can be folded into said base between edges of said lip.

5. A collapsible storage divider for a vehicle comprising:

a molded polymeric base having a raised lip extending around the outer periphery thereof;

front and rear walls pivotally mounted to said base within opposite edges of said peripheral lip;

end walls mounted to edges of said front and rear walls for collapsing flat as said front and rear walls are folded toward one another to a flat position within said peripheral lip of said base such that said storage member is substantially flat when folded to a stored position; and a locking member for holding said divider unit in an open position with said front and rear walls and sidewalls in a generally vertically raised position for use, wherein said locking member comprises at least one rigid partition wall pivotally mounted to said base between said front and rear walls for holding said front and rear walls in a raised, vertical position when said partition is raised to a substantially vertical position, and wherein said inside-facing surfaces of said front and rear walls include aligned opposed arcuate slots and said partition includes tabs which extend into said arcuate slots for guiding said partition as it is moved from a flat stored position adjacent said base to a raised vertical position.

6. The storage divider as defined in claim 5 wherein said arcuate slots extend through an angle of about 90°.

7. The storage divider as defined in claim 6 wherein said slots terminate in a notch for releasably holding said partition in a vertical position.

8. The storage divider as defined in claim 7 including a plurality of partitions.

9. A collapsible storage divider for a vehicle comprising:

front and rear walls having pivot pins at opposite corners thereof and inside-facing surfaces with tab-receiving slots formed therein;

a blow-molded tray-like base having a peripheral lip including sockets at each of the corners for snap-in receiving of said pivot pins for pivotally mounting said front and rear walls within said peripheral lip of said base;

end walls mounted to said front and rear walls for collapsing when said front and rear walls are pivoted to a stored position; and a partition wall for holding said divider in an open position with said front and rear walls and sidewalls in a generally vertically raised position for use, said partition wall pivotally mounted to said base between said front and rear walls and having locking tabs engaging said tab-receiving slots of said front and rear walls for guiding and holding said front and rear walls as said partition is raised from a flat stored position to a substantially vertical position.

10. The storage divider as defined in claim 9 wherein said end walls are made of fabric.

* * * * *